(12) United States Patent
Brown et al.

(10) Patent No.: US 6,879,139 B2
(45) Date of Patent: Apr. 12, 2005

(54) SEQUENCING POWER SUPPLIES

(75) Inventors: David Alan Brown, Carp (CA); Muge Guher, Ottawa (CA)

(73) Assignee: Potentia Semiconductor, Inc., Kanata (CA)

( * ) Notice: Subject to any disclaimer, the term of this patent is extended or adjusted under 35 U.S.C. 154(b) by 0 days.

(21) Appl. No.: 10/428,105

(22) Filed: May 2, 2003

(65) Prior Publication Data

US 2004/0217750 A1 Nov. 4, 2004

(51) Int. Cl.[7] .............................. G05F 5/00; G06F 1/26
(52) U.S. Cl. ..................................... 323/299; 713/330
(58) Field of Search .................................. 323/299, 301, 323/303; 713/310, 330, 340; 307/18, 24, 29, 31, 51, 52, 80, 85

(56) References Cited

U.S. PATENT DOCUMENTS

| | | | | |
|---|---|---|---|---|
| 4,323,789 A | * | 4/1982 | Dion ........................... | 307/81 |
| 5,878,264 A | * | 3/1999 | Ebrahim ..................... | 713/323 |
| 6,125,440 A | * | 9/2000 | Osovets ....................... | 712/205 |
| 6,237,103 B1 | * | 5/2001 | Lam et al. .................. | 713/330 |
| 6,333,650 B1 | | 12/2001 | Amin et al. | |
| 6,429,706 B1 | | 8/2002 | Amin et al. | |
| 6,671,816 B1 | * | 12/2003 | Woo ........................... | 713/330 |

OTHER PUBLICATIONS

Modular Solid–State Power Sequencing, Goodew et al., IBM Technical disclosure Bullevin vol. 15, No. 12, pp. 3697–3699, May 1973.

"LTC1645 Dual–Channel Hot Swap Controller/Power Sequencer", Linear Technology Corporation, 1999.

"Power Supply Sequencing Solutions for Dual Supply Voltage DSPs", Texas Instruments Application Report, SLVA073A, Jul. 2000.

"Power–supply Sequencing for low–voltage processors", B. Bush, EDN, Sep. 1, 2000.

"Modular Solid–State Power Sequencing"; IBM Technical Disclosure Bulletin; XP–002292120; vol. 15; No. 12; May 1973; pp. 3697–3699.

"Data Processing System Power Controller"; IBM Technical Disclosure Bullein; XP–002292121; vol. 23; No. 7A; Dec. 1980; pp. 2651–2652.

"Individual I/O Sequence Control"; IBM Technical Disclosure Bulletin; XP–000714872; vol. 27; No. 12, May 1985; pp. 6862–6863.

* cited by examiner

*Primary Examiner*—Matthew V. Nguyen

(57) ABSTRACT

Power supplies are enabled and disabled in sequence in dependence upon monitored output voltages of, and an input voltage for, the power supplies. Bits stored in registers for each power supply represent the predetermined sequences in which the power supplies are enabled and disabled, and fault dependencies for the power supplies. The sequences can include independent, linear, divergent, and convergent paths. The registers are loaded from a non-volatile memory on power-up of a power supply controller also powered from the input voltage.

21 Claims, 3 Drawing Sheets

SEQUENCING POWER SUPPLIES

REFERENCE TO RELATED APPLICATIONS

Reference is directed to the following copending United States Patent Applications filed simultaneously herewith, the entire disclosure of each of which is hereby incorporated herein by reference:

"Power Supply Controller", R. Orr et al., (Ser. No. 10/428,095);

"Signal And Power Transformer Coupling Arrangements", R. Orr et al., (Ser. No. 10/428,103);

"Coupling Signals Via A Coupling Arrangement", D. Brown et al., (Ser. No. 10/428,102);

"Transformer Coupling Arrangement And Method Using A Plurality Of Drivers", D. Brown, (Ser. No. 10/428,104).

BACKGROUND

The related applications relate to a power supply controller which can be used for controlling a plurality of isolating power supplies, such as switch mode power supplies or DC power converters, for providing controlled electrical power to loads. For example, the power supplies may provide different supply voltages to various electrical circuits on a circuit card on which the power supply controller is also provided.

In such a power supply controller, separate IC (integrated circuit) control units can be provided on the primary and secondary sides of a transformer that serves to maintain an electrical isolation barrier between input and output sides of the isolating power supplies. The transformer conveniently provides for signal coupling in both directions between the primary and secondary control units, and also for power transfer from its primary to its secondary side to supply operating power to the secondary control unit and any related circuits (for example, a non-volatile memory) of the power supply controller on the secondary side of the transformer.

As described in the related applications, the power supply controller and the signal coupling within it are arranged for controlling up to six power supplies. To this end, each of the primary and secondary control units has six converter state machines (CSMs), one for each of up to six controlled power supplies, as well as an input state machine (ISM) relating to an input or supply voltage.

A primary aspect of the control of the power supplies relates to their sequencing in accordance with conditions monitored by the power supply controller. Sequencing refers to an order in which, and parameters in dependence upon which, the power supplies are enabled in a power-up process, disabled or shut down in a normal power-down process, and/or disabled or shut-down in a fault situation. The monitored conditions include, for example, output voltages produced by the respective power supplies, and an input voltage of a power source which powers all of the power supplies and the power supply controller.

It is known to provide a power supply controller or sequencer which performs such functions for a plurality of power supplies. For example, one such power supply controller is known from "Modular Solid-State Power Sequencing", Goodew et al., IBM Technical Disclosure Bulletin Vol. 15, No. 12, pages 3697–3699, May 1973. In that controller, modules each for control of a respective power supply are connected together in a fixed manner to power up the power supplies in sequence one after another, and to power them down normally in a reverse sequence. In the event of a fault, that controller powers down the power supplies in an order that depends on the module detecting the fault.

In different arrangements of power supplies it would be desirable to be able to provide relatively arbitrary sequence topologies for the respective power supplies, rather than only the fixed, linear sequence topology as disclosed by this prior art.

Accordingly, there is a need to provide an improved method of sequencing power supplies.

SUMMARY OF THE INVENTION

According to one aspect, this invention provides a method of enabling a plurality of devices to provide outputs in a predetermined sequence, comprising the steps of: for at least one device, storing an indication that the device is to be enabled in response to an input condition; for each other device, storing an indication of at least one device that is to be enabled prior to this device, whereby the stored indications represent the predetermined sequence; monitoring an output of at least each such prior enabled device for a respective output condition which occurs in response to enabling of the respective device; and enabling each device in response to said input condition or each respective output condition according to the stored indication(s) for the device.

In an embodiment of this method, the devices comprise power supplies, for each power supply the output condition comprises an output voltage of the power supply being above a threshold value, the input condition comprises an input voltage for the power supplies being above a threshold value, and for each device each indication comprises a bit of a register in which bit positions correspond to respective ones of the devices.

Another aspect of the invention provides a method of enabling a plurality of power supplies to provide output voltages in a predetermined sequence, comprising the steps of: for at least one of the power supplies, storing an indication that the power supply is to be enabled in dependence upon an input voltage; for each other power supply, storing an indication of at least one power supply that is to be enabled prior to this power supply and in dependence upon an output voltage of which this power supply is to be enabled, whereby the stored indications represent the predetermined sequence; monitoring an output voltage of at least each such prior enabled power supply; and enabling each power supply in dependence upon said input voltage or a respective output voltage according to the stored indication(s) for the power supply.

Conveniently, for each power supply each stored indication comprises a bit of a register in which different ones of the power supplies are represented by respective bit positions.

The step of storing the indications can comprise storing the indications in a non-volatile memory and storing the indications from the memory in the registers in dependence upon said input voltage.

The indication that the power supply is to be enabled in dependence upon an input voltage can be stored for each of at least two of the power supplies. This provides a sequence topology with independent enabling paths.

Alternatively, or in addition, an indication of the same prior enabled power supply can be stored for each of at least two power supplies for each of which an indication of a prior enabled power supply is stored. This provides a sequence topology with divergent enabling paths.

Alternatively, or in addition, an indication of each of a plurality of prior enabled power supplies can be stored for at least one power supply for which an indication of a prior enabled power supply is stored, this at least one power supply being enabled for an AND combination of the indications of said plurality of prior enabled power supplies. This provides a sequence topology with convergent enabling paths.

The method preferably further comprises the step of disabling the power supplies in a predetermined disabling sequence, the step of disabling comprising the steps of, for each of a plurality of the power supplies, storing an indication of at least one power supply that is to be disabled prior to this power supply and in dependence upon an output voltage of which this power supply is to be disabled, the stored indications representing the predetermined disabling sequence, and disabling each of this plurality of the power supplies in dependence upon the respective output voltage according to the stored indication(s) for disabling the power supply.

In this case, for each power supply each stored indication for enabling the power supply can comprise a bit of a first register, and each stored indication for disabling can comprise a bit of a second register, different ones of the power supplies being represented by respective bit positions in said first and second registers.

An indication of the same prior disabled power supply can be stored for each of at least two power supplies for each of which an indication of a prior disabled power supply is stored. This provides a sequence topology with divergent disabling paths.

Alternatively, or in addition, an indication of each of a plurality of prior disabled power supplies can be stored for at least one power supply for which an indication of a prior disabled power supply is stored, this at least one power supply being disabled for an AND combination of the indications of said plurality of prior disabled power supplies. This provides a sequence topology with convergent disabling paths.

The method preferably further comprises the step of disabling power supplies in response to detected faults, the step of disabling in response to detected faults comprising the steps of, for each of a plurality of the power supplies, storing an indication of at least one power supply in response to a detected fault for which this power supply is to be disabled, and disabling each respective power supply in response to a detected fault for any power supply for which an indication is stored for disabling the power supply in response to such a detected fault, the power supplies disabled in response to a detected fault being disabled in said predetermined disabling sequence.

The invention also provides a power supply controller for carrying out a method as recited above, the power supply controller comprising at least one control unit for monitoring said output voltages and for enabling each of said power supplies, said at least one control unit comprising a respective register for storing said indications for each of the power supplies to be enabled by the power supply controller.

The at least one control unit can further comprise a configuration register for information of connected power supplies to be enabled by the power supply controller and can be arranged to be powered from said input voltage, the power supply controller further comprising a non-volatile memory for storing said indications, and being arranged to store said indications from the memory in the respective registers in dependence upon said input voltage.

BRIEF DESCRIPTION OF THE DRAWINGS

The invention will be further understood from the following description by way of example with reference to the accompanying drawings, in which.

DETAILED DESCRIPTION

Figure 1:
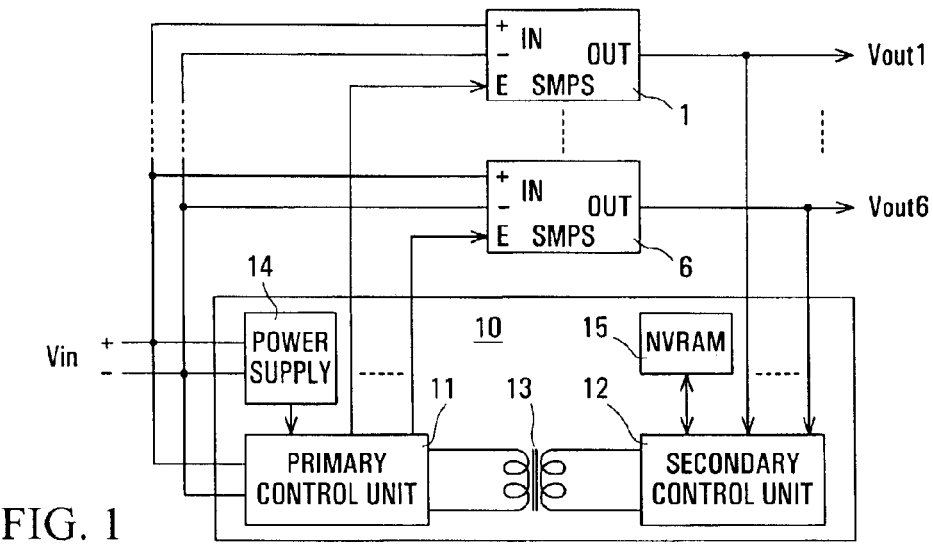
FIG. 1 shows a block diagram of a power supply controller and a plurality of controlled power supplies.

Referring to FIG. 1, a power supply controller 10 is illustrated for controlling a plurality of isolating power supplies, for example up to six power supplies two of which are represented in FIG. 1 by switched mode power supplies (SMPS) 1 and 6, others being indicated by dashed lines. The power supply controller 10 comprises two control units 11 and 12, referred to as primary and secondary control units respectively, which are isolated from one another and between which signals are coupled in both directions by a transformer 13. The power supply controller 10 also comprises a power supply 14 for the primary control unit 11, and a non-volatile memory (NVRAM) 15 coupled to the secondary control unit 12.

Each of the power supplies 1, . . . 6 has an enable input E and inputs + and − for a source voltage Vin on its primary side, and an isolated output OUT on its secondary side providing a respective output voltage Vout1, . . . Vout6. These output voltages are monitored by the secondary control unit 12 by connections to the output paths as illustrated, and the primary control unit 11 controls the power supplies 1, . . . 6 by connections to the respective enable inputs E. The isolation provided by the transformer 13 maintains the isolation of the power supplies 1, . . . 6 between their primary and secondary sides. The source voltage Vin is also supplied to the power supply 14, which provides a regulated supply voltage to the primary control unit 11, and is monitored by the primary control unit 11 as further described below.

A supply voltage for the secondary control unit 12 and the NVRAM 15 can be derived from a separate isolating power supply (not shown) from the primary side, but is preferably derived from the secondary side of the transformer 13 by rectifying signals coupled from the primary control unit and driven with a sufficient current drive to provide this secondary supply voltage, as described in the related applications. The NVRAM 15 serves to store information used in operation of the power supply controller 10, this information being transferred to shadow registers in the control units 11 and 12 on power-up of the power supply controller 10.

By way of example, the power supply controller 10 and the controlled power supplies 1, . . . 6 may all be provided on a circuit card which also includes electrical circuits constituting loads to be powered by the power supplies. In use, the circuit card is inserted in an equipment slot and thereby connected to a backplane which provides + and − connections to a power source providing the voltage source Vin, which is for example a nominally 48 volt source.

Although not shown in FIG. 1, the control units 11 and 12 can include further connections to the power supplies 1, . . . 6, for example for trimming their output voltages and/or enabling the power supplies via secondary side enable inputs.

All of the components 11 to 15 of the power supply controller 10 are desirably integrated into a single package, in which each of the control units 11 and 12 conveniently comprises an application-specific IC (ASIC).

Each of the control units 11 and 12 includes six converter state machines (CSMs), referred to as CSM0 to CSM5, each provided for a respective one of the six controlled power supplies 1, . . . 6, and an input state machine (ISM) in respect of the source voltage Vin, between which signals are exchanged by being broadcast on a shared bus. This bus is extended between the primary and secondary control units 11 and 12 through the signal coupling in both directions via the transformer 13. Via these communications, synchronism is maintained between the corresponding state machines in the two control units 11 and 12.

Predominantly, states are determined by the CSMs in the secondary control unit 12, where the monitoring of the output voltages of the corresponding power supplies takes place, and signals from these CSMs are communicated via the bus and the transformer 13 to maintain synchronism of the respective CSMs in the primary control unit 11. For example, CSM0 in each of the control units 11 and 12 may be allocated to the power supply 1. While this power supply is disabled, the CSM0 in the secondary control unit 12 may determine that it is to be enabled, and communicate this via the bus and the transformer 13 to the CSM0 in the primary control unit 13, which enables the power supply 1 via the latter's enable input E and acknowledges the new state so that the CSM0 in both control units remain synchronized as to the state of the power supply 1.

In view of this synchronism of the CSMs in the control units 11 and 12, and similarly of the ISMs in these control units, in the following description no distinction is made between the corresponding state machines of the two control units 11 and 12.

By way of example, the bus providing for communications among the state machines can be an 8-bit bus which is daisy-chained through all of the state machines and operated in a tdm (time division multiplex) manner with 8 time slots each allocated for communications from a respective state machine to the bus. Each state machine drives the bus with its own information during its allocated time slot, and in the other time slots can receive the information of the other state machines.

When the source or input voltage Vin is initially connected, a power-up process is followed in which the power supply controller 10 disables all of the controlled power supplies 1, . . . 6, establishes power transfer to the secondary control unit 12 and signal communications between the control units 11 and 12 via the transformer 13, and downloads information stored in the NVRAM 15 to shadow registers in the control units 11 and (via the transformer 13) 12. This downloaded information includes information, for example as further described below, for determining the operation of the power supply controller 10, and in particular for sequencing the controlled power supplies 1, . . . 6 so that they are powered up and down in a desired and controlled manner.

Figure 2:
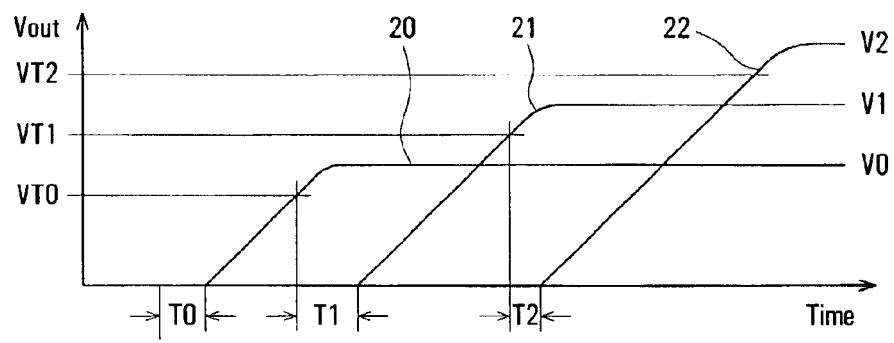
FIG. 2 is a diagram illustrating a linear sequencing of three power supplies controlled by the power supply controller of FIG. 1.

By way of example, FIG. 2 illustrates, in a graph of output voltage Vout as a function of time, a power-up sequence for three controlled power supplies, assumed to be controlled by CSM0, CSM1, and CSM2 respectively in this sequence and in accordance with time delays T0, T1, and T2 respectively and start-up threshold voltages VT0, VT1, and VT2 respectively. These time delays and threshold voltages are part of the information downloaded from the NVRAM 15. The output voltages of the controlled power supplies, ultimately V0, V1, and V2 respectively, are represented by lines 20, 21, and 22 respectively.

In FIG. 2, it is assumed that the ISM determines that all of the applicable conditions (discussed further below) for initiating a power-up sequence are satisfied at a time t0. The CSM0 for the first controlled power supply in the power-up sequence times its start-up delay T0 and then enables its power supply, the output voltage of which accordingly rises as shown by the line 20 to cross its threshold voltage VT0, at which time the CSM0 broadcasts a message indicating this.

In response to this message, the CSM1 for the second controlled power supply in the power-up sequence times its start-up delay T1 and then enables its power supply, the output voltage of which accordingly rises as shown by the line 21 to cross its threshold voltage VT1, at which time the CSM1 broadcasts a message indicating this. Similarly, in response to this message, the CSM2 for the third controlled power supply in the power-up sequence times its start-up delay T2 and then enables its power supply, the output voltage of which accordingly rises as shown by the line 22 to cross its threshold voltage VT2, at which time the CSM2 broadcasts a message indicating this.

Figure 3:
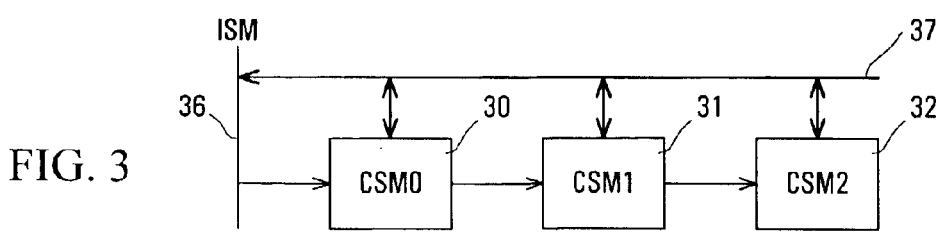
FIG. 3 illustrates a sequence topology of converter state machines (CSMs) in the power supply controller of FIG. 1 corresponding to the linear sequencing of FIG. 2.

FIG. 3 illustrates a corresponding sequence topology of the CSMs for this linear power-up sequence. A vertical line 36 represents satisfaction of the conditions for initiating the power-up sequence as determined by the ISM, and is labelled ISM, accordingly. Boxes 30, 31, and 32 identify the state machines CSM0, CSM1, and CSM2 respectively, and arrows represent the linear power-up sequence from the line 36 to the box 30, the box 30 to the box 31, and the box 31 to the box 32. In addition, in FIG. 3 the bus via which messages are communicated among the state machines is represented by a bold line 37.

FIGS. 2 and 3 relate to a linear power-up sequence for three CSMs, but it is desirable to accommodate any relatively arbitrary power-up sequence for an arbitrary number (up to six in this case) of CSMs and corresponding controlled power supplies.

Figures 4, 5:
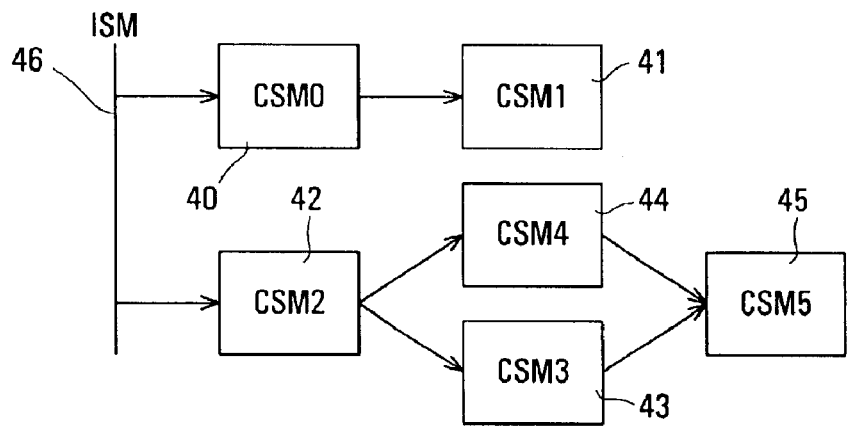
FIG. 4 illustrates a relatively arbitrary sequence topology of six CSMs in the power supply controller of FIG. 1 in accordance with an embodiment of the invention.
FIG. 5 illustrates register contents of the CSMs corresponding to the sequence topology of FIG. 4, in accordance with an embodiment of the invention.

By way of example, FIG. 4 illustrates a relatively arbitrary sequence topology of the six CSMs in the power supply controller 10, using a similar representation to that of FIG. 3. Compared with the linear sequence of FIGS. 2 and 3, FIG. 4 illustrates independent, linear, diverging, and converging sequences any or all of which can be provided by the power supply controller 10.

More particularly, in FIG. 4 a vertical line 46 labelled ISM represents determination by the ISM that conditions for initiating a power-up sequence are satisfied, boxes 40 to 45 identify the state machines CSM0 to CSM5 respectively, and arrows represent the power-up sequencing. As shown in FIG. 4, separate arrows lead from the line 46 to the boxes 40 and 42 for CMS0 and CMS2 respectively, so that these operate independently each in response to the initial conditions being met, and each in accordance with its respective start-up delay and threshold voltage. An arrow from the box 40 to the box 41 represents a linear sequence from CSM0 to CSM1, similar to that described above with reference to FIG. 3.

From the box 42, separate arrows diverge to the boxes 43 and 44, indicating that each of CSM3 and CSM4 is sequenced after CSM2. In other words, enabling of each of the power supplies controlled by CSM3 and CSM4 takes place, after the respective start-up delay, in response to CSM2 determining and communicating that the monitored output voltage of its controlled power supply exceeds its respective threshold voltage. It is noted here that any of the respective start-up delays may be zero.

Conversely, separate arrows from the boxes 43 and 44 converge to the box 45, representing that enabling of the power supply controlled by CSM5 takes place (after the respective start-up delay) only in response to both of CSM3 and CSM4 determining and communicating that the monitored output voltages of their respective controlled power supplies exceed the respective threshold voltages.

Although FIG. 4 relates to the topology for a power-up sequence, it can be appreciated that in a similar manner a topology for a normal shut-down sequence, and a topology for a fault shut-down sequence in the event of a fault condition, can be represented. Although the topology for a normal shut-down sequence may typically be the reverse of the power-up sequence topology, this need not necessarily be the case.

To these ends, in the power supply controller 10 in an embodiment of the invention, a configuration register is provided for information representing which of the six CSMs has an associated controlled power supply, and each of the CSMs has three registers for information representing the sequencing of the respective power supply for power up, normal shut-down, and fault shut-down, respectively. As this information is only used by the secondary control unit 12, these registers need only be provided in the secondary control unit, the information being stored in and downloaded from the NVRAM 15 as described above. These registers are some of the shadow registers as discussed above.

FIG. 5 illustrates an example of these registers and their contents for the power-up sequence topology of FIG. 4. The configuration register is denoted CONFIG, and the three registers for each of the CSMs are denoted STRTEN(n) for start or power-up enabling, SHDNEN(n) for normal shut-down enabling, and FLTEN(n) for fault shut-down enabling, where in each case n is constituted by a number, 0 to 5, for CSM0 to CSM5 respectively.

FIG. 5 shows each register as having eight bits numbered 0 to 7, bits 0 to 5 identifying the CSMs CSM0 to CSM5 respectively. Except in the register CONFIG, bit 6 identifies the ISM, and bit 7 is unused as described here. Bits 6 and 7 of the register CONFIG are zero to represent that the power supply controller 10 is a stand-alone controller, and each of bits 0 to 5 is 1 to indicate that the respective CSM, CSM0 to CSM5, controls a respective power supply, as represented by the topology of FIG. 4 in which all of the CSMs are present. A CSM which does not control a power supply would be represented by a 0 in the respective bit position in the register CONFIG.

For enabling its controlled power supply for example on power-up, each CSM is sensitive to one or more conditions of other state machines as configured by one or more 1 bits in the register STRTEN(n). If there are two or more 1 bits in the register STRTEN(n), the respective conditions must all be satisfied, i.e. an AND function applies, for the respective CSM to enable its controlled power supply.

Thus in FIG. 5 the register STRTEN(O) of CSM0 contains a single 1 bit, in bit position 6 corresponding to the ISM conditions for initiating a power-up sequence as discussed above, consistent with the dependence of CSM0 on only the ISM for the power-up sequence as shown in FIG. 4. The register STRTEN(1) of CSM1 contains a single 1 bit, in bit position 0 corresponding to CSM0, consistent with the dependence of CSM1 on only CSM0 for the power-up sequence as shown in FIG. 4.

Similarly, the registers STRTEN(2), STRTEN(3), and STRTEN(4) each contain a single 1 bit, in bit positions 6, 2, and 2 to configure CSM2, CSM3, and CSM4 for dependence on ISM, CSM2, and CSM2, respectively, consistent with the dependence of these CSMs for the power-up sequence shown in FIG. 4. The register STRTEN(5) contains two 1 bits, in bit positions 3 and 4, to configure CSM5 to be dependent for power-up on both CSM3 and CSM4, as shown by the convergent dependence of CSMS in FIG. 4.

Thus each CSM is configured to be responsive to a message, referred to as a start message, from one or more other state machines according to the 1 bits in its register STRTEN(n). On establishing that the initial conditions for a power-up sequence are met, the ISM broadcasts a start message via the bus, and any CSM configured in this manner to respond to this ISM start message (e.g. CSM0 and CSM2 in FIGS. 4 and 5) initiates its start-up delay and enables its controlled power supply accordingly. When the output voltage of each such power supply, monitored by the respective CSM, exceeds the respective threshold voltage as shown in FIG. 2, the respective CSM broadcasts on the bus its own start message, and any CSM configured as described above to respond to this CSM start message initiates its start-up delay and enables its controlled power supply accordingly. This process continues progressively to start-up the power supplies of all of the CSMs, in the desired power-up sequence as configured in the registers STRTEN(n).

In this manner, the power-up sequence provided by the power supply controller 10 can have any arbitrary topology. Similarly, using the registers SHDNEN(n) and FLTEN(n) the power supply controller 10 can have any arbitrary topology for normal shut-down and for fault shut-down.

For example, FIG. 5 shows in the registers SHDNEN(n) bits for a normal shut-down sequence which is the reverse of the power-up sequence. Each 1 bit in these registers identifies a state machine to which the respective CSM is configured to be sensitive for normal shut-down. As for the registers STRTEN(n) as described above, any of the registers SHDNEN(n) can have two or more 1 bits for respective state machines, with an AND function applying for the CSM to power down (disable, via the enable input E) the respective power supply.

Thus, referring to FIG. 5, in response to the ISM broadcasting a normal shut-down message on the bus, for example due to the ISM determining an under-voltage of the input voltage Vin, each of CSM1 and CSM5, for which there is a 1 in the corresponding bit 6 of the registers SHDNEN(1) and SHDNEN(5), starts timing a respective normal shut-down delay (which may be zero) and, at the end of this normal shut-down delay, disables its controlled power supply via the enable input E of the power supply. The output voltage of the power supply consequently falls, and the respective CSM determines when this monitored output voltage falls below a respective normal shut-down threshold and then broadcasts on the bus a normal shut-down message for this CSM.

Any CSM configured to respond to this CSM normal shut-down message—in FIG. 5 CSM0 in response to the CSM1 normal shut-down message, and CSM3 and CSM4 in response to the CSM5 normal shut-down message, due to the 1 configured as bit 1 of the register SHDNEN(0) and bit 5 of registers SHDNEN(3) and SHDNEN(4)—initiates its normal shut-down delay at the end of which it disables its controlled power supply accordingly. This process continues progressively to shut down the power supplies of all of the CSMS, in the desired normal shut-down sequence as configured in the registers SHDNEN(n). As the register SHDNEN(2) has a 1 in each of bits 3 and 4, normal shut-down messages from both CSM3 and CSM4 are required for normal shut-down of the power supply controlled by CSM2.

In an implementation of the power supply controller 10, the normal shut-down process can be as described above, and an additional fast shut-down process, for example using shorter shut-down delays, can be followed in a similar manner in response to fast shut-down messages arising for example from under-voltage fault conditions, as described further below.

FIG. 5 also shows in the registers FLTEN(n) an example of bits which represent sensitivity of the respective CSMs to fault messages from the ISM and the CSMs. CSM fault messages can comprise under-voltage (UV) or over-voltage (OV) messages, each CSM broadcasting such a fault message to the bus in the event that the monitored output voltage of its controlled power supply is below a UV threshold or above an OV threshold for a respective period of time. The sensitivity of the CSMs and hence the bits of the registers FLTEN(n) are the same for the different UV and OV messages, but the CSMs can respond to these messages in slightly different ways.

Each 1 in a bit of one of the registers FLTEN(n) indicates that the CSM for which that register is provided is sensitive to fault messages broadcast by the respective state machine corresponding to that bit position in the register. In this case each CSM responds to a fault message from any one (or more) of the state machines for which it has a 1 bit in the respective FLTEN(n) register, i.e. an OR function applies.

For example, in response to CSM2 detecting an OV or UV fault of the power supply that it controls, it broadcasts an OV or UV message to the bus. CSM2, and each CSM that is downstream from it in the power-up sequence as shown in FIG. 4, i.e. CSM3, CSM4, and CSM5, each have a 1 as bit 2 of the respective registers FLTEN(2) to FLTEN(5), in accordance with which each of them responds to this OV message by starting a respective fault shut-down delay and, on expiry of this delay, disabling the associated controlled power supply via its enable input E. CSM2 can also, or alternatively, be intrinsically sensitive to its own detection of the OV or UV fault. The fault shut-down delays can be very short and can be staggered to provide rapid but progressive shut-down of the controlled power supplies in the desired shut-down sequence.

When each of these CSMs determines that the monitored output voltage of its controlled power supply has fallen below a respective threshold voltage, which may be different for the OV and UV cases, it broadcasts a respective normal shut-down message to the bus. Desirably as described above there is a fast shut-down process, in which case this fast shut-down process is followed in the case of an OV fault, and the normal, slower, shut-down process is followed in the case of a UV fault. In either case, this shut-down message is handled by the CSMs in the same manner as described above with respect to the registers SHDNEN(n).

The conditions for initiating a power-up sequence as described above and determined by the ISM can include, for example, a threshold voltage and related period which must be exceeded by the input voltage Vin, information and a period to ensure that the circuit card on which the power supply controller is provided is inserted and seated in a correct equipment slot, a period which must have expired following any previous fault causing a power-down of the controlled power supplies, and receipt of messages from the CSMs to ensure that all of the controlled power supply output voltages are below respective thresholds for restart.

This configuration information for the ISM, as well as the configuration and sequencing information for the registers in FIG. 5 as described above, information as to the thresholds and delay periods for the CSMs as discussed above, and further information for the CSMs for example as further described below, is all stored in the NVRAM 15 and downloaded to the control units 11 (to the extent that the control unit 11 requires this information for operation of the power supply controller) and 12 on power-up of the power supply controller 10, as described above. Accordingly, this information can be provided in the NVRAM 15 to configure the power supply controller 10 for operation in any desired manner, and in particular in accordance with relatively arbitrary sequencing requirements.

The further information for the CSMs referred to above can for example include information for voltage and time masks for start-up of the controlled power supplies, such as a time period for start-up to be completed before under-voltage monitoring takes effect, and voltage parameters relating to the adjustment or trimming of the controlled power supplies. It can be appreciated that all of such information stored in the NVRAM 15 and transferred to shadow registers for the state machines is given here by way of example, and in different embodiments of the invention other or different information may be stored and used instead.

Referring again to the linear power-up sequence of FIG. 3, it can be appreciated from the above description that this is readily configured by a 1 in bit 6 of the register STRTEN(0), in bit 0 of the register STRTEN(1), and in bit 1 of the register STRTEN(2), the other bits of these registers all being 0. It can also be seen that a reversed linear shut-down sequence for power supplies controlled by these three CSMs is configured by a 1 in bit 6 of the register SHDNEN(2), bit 2 of the register SHDNEN(1), and bit 1 of the register SHDNEN(0), the other bits of these registers being 0. Bits of the registers FLTEN(0) to FLTEN(2) can similarly be determined.

Figure 6:
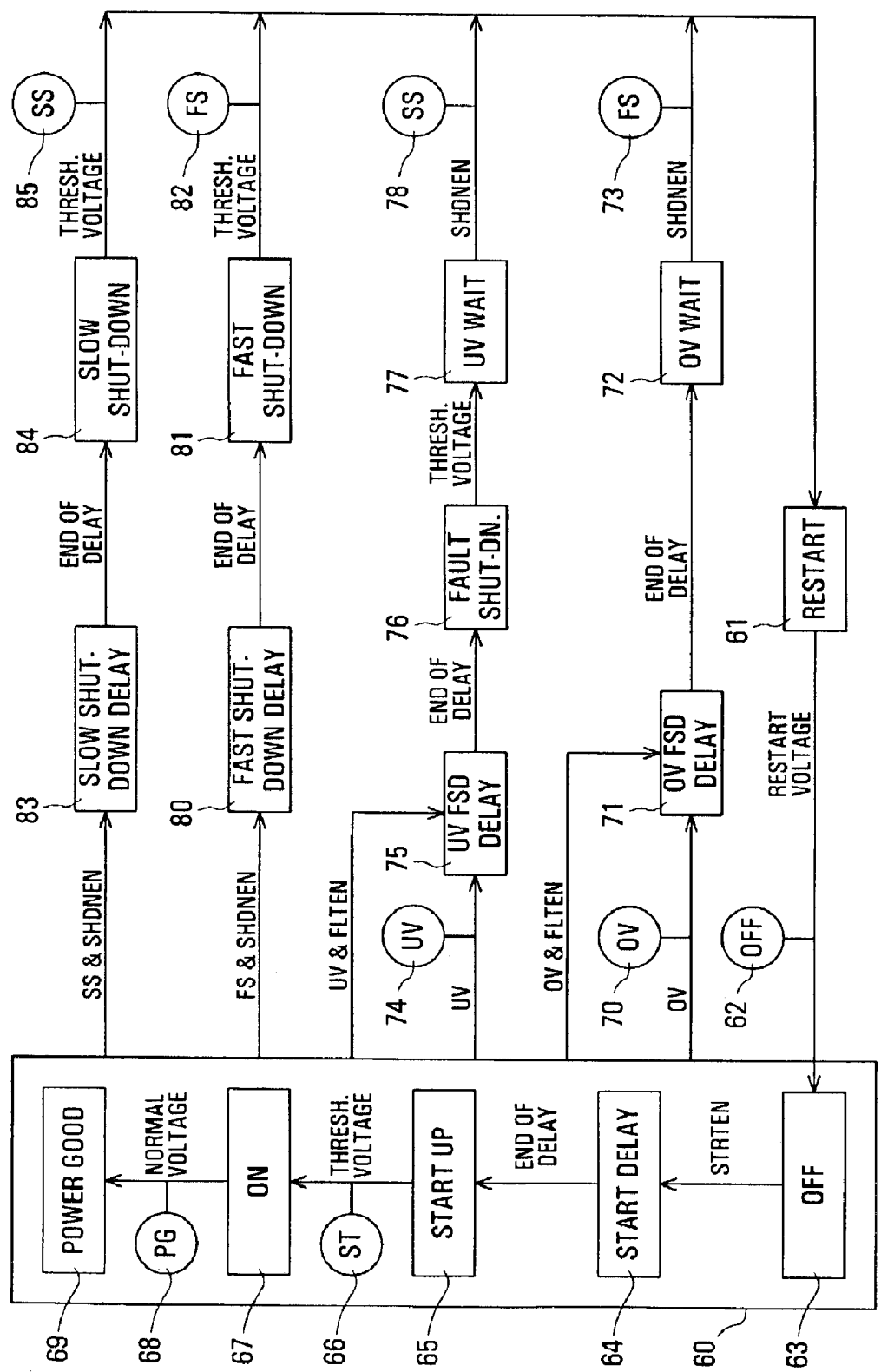
FIG. 6 shows a state diagram for each of the CSMs, in accordance with an embodiment of the invention.

FIG. 6 shows a state diagram for each of the CSMs, in which CSM states are represented by boxes, transitions between states are represented by arrowed lines between the boxes with conditions for these transitions indicated by text adjacent to the lines, and messages broadcast by the CS1 are represented by circles. Normal, non-fault operating states of the CSM are shown within a box 60; from any of these states faults produce transitions to the respective fault states outside this box 60, as further described below. The state diagram of FIG. 6 assumes that the fast shut-down process is provided as well as the normal, slower shut-down process as described above, the later being referred to as slow shut-down for clarity.

Referring to FIG. 6, the power controller 10 is powered up with the CSM in a RESTART state 61 from which, if the monitored output voltage of the controlled power supply is less than a restart voltage, the CSM broadcasts on the bus an OFF message 62 and transitions to an OFF state 63. On receiving from the bus each start message, from the ISM or another CSM, that it requires according to the 1 bit(s) in its register STRTEN as described above, the CSM transitions to a START DELAY state 64 in which it times the start-up delay as described above, and then at the end of this delay to a START UP state 65 in which it enables the controlled power supply. When the monitored output voltage of the power supply exceeds the threshold voltage as described above with reference to FIG. 2, the CSM broadcasts a start (ST) message 66 and transitions to an ON state 67. After expiry of masking times for OV and UV thresholds associated with start-up of the power supply, the power supply produces at its output a normal voltage, and the CSM broadcasts a PG (power good) message and transitions to a POWER GOOD state 69 which is the normal operating state.

In response to detecting an over-voltage OV of the monitored output of the controlled power supply, from any of the states 63–65, 67, and 69 within the box 60, the CSM broadcasts an OV message 70 and transitions to an OV FSD (fault shut-down) DELAY state 71. It also adopts this state 71 on receiving via the bus an OV message from any other state machine for which it has a 1 bit in its register FLTEN. In the state 71 it times the OV FSD delay, at the end of which it transitions to an OV WAIT state 72 in which it disables its controlled power supply and waits until a slow or fast shut-down message has been received via the bus from each other state machine for which it has a 1 bit in its register SHDNEN. It then broadcasts a fast shut-down (FS) message 73 and returns to the RESTART state 61.

In response to detecting an under-voltage UV of the monitored output of the controlled power supply, from any of the states within the box 60, the CSM broadcasts a UV message 74 and transitions to a UV FSD (fault shut-down) DELAY state 75. It also adopts this state 75 on receiving via the bus a UV message from any other state machine for which it has a 1 bit in its register FLTEN. In the state 75 it times the UV FSD delay, at the end of which it transitions to a FAULT SHUT-DN state 76 in which it disables the controlled power supply and waits until its monitored output voltage falls below a UV fault shut-down threshold. It then transitions to a UV WAIT state 77 in which it waits until a slow or fast shut-down message has been received via the bus from each other state machine for which it has a 1 bit in its register SHDNEN. It then broadcasts a slow shut-down (SS) message 78 and returns to the RESTART state 61.

In response to receiving via the bus an FS. (fast shut-down) message from each other state machine for which the CSM has a 1 bit in its register SHDNEN, the CSM transitions to a FAST SHUT-DOWN DELAY state 80 in which it times the fast shut-down delay, at the end of which it transitions to a FAST SHUT-DOWN state 81 in which it disables its controlled power supply and waits until its monitored output voltage falls below a fast shut-down threshold. It then broadcasts a fast shut-down (FS) message 82 and returns to the RESTART state 61.

Similarly, in response to receiving via the bus an SS (slow shut-down) message from each other state machine for which the CSM has a 1 bit in its register SHDNEN, the CSM transitions to a SLOW SHUT-DOWN DELAY state 83 in which it times the slow shut-down delay, at the end of which it transitions to a SLOW SHUT-DOWN state 84 in which it disables its controlled power supply and waits until its monitored output voltage falls below a slow shut-down threshold. It then broadcasts a slow shut-down (SS) message 85 and returns to the RESTART state 61.

Among other things, the ISM transitions from a restart start to an off state in response to receiving an OFF message for all of the CSMs identified by 1 bits in the CONFIG register as described above, and subsequently, subject to other parameters including a stable input voltage Vin, broadcasts a start (ST) message to initiate the power-up sequence as described above.

Although in the above description the ISM and CSMs in each of the first and second control units are described in the form of state machines in an ASIC, it can be appreciated that these can be implemented in any other desired manner, for example as multiplexed processes of a microcontroller. In addition, it can be appreciated that the functions of the ISM and the CSMs can be provided in a single control unit, rather than in two synchronized control units as described above. Furthermore, although the invention is described above in the context of controlling power supplies in a predetermined sequence, it can alternatively be applied in a similar manner to enabling a plurality of devices, which may be other than power supplies, in a predetermined sequence.

Thus although particular embodiments of the invention and examples have been described above in detail, it can be appreciated that numerous modifications, variations, and adaptations may be made without departing from the scope of the invention as defined in the claims.

What is claimed is:

1. A method of enabling a plurality of devices to provide outputs in a predetermined sequence, comprising the steps of:

for at least one device, storing an indication that the device is to be enabled in response to an input condition;

for each other device, storing an indication of at least one device that is to be enabled prior to this device, whereby the stored indications represent the predetermined sequence;

monitoring an output of at least each such prior enabled device for a respective output condition which occurs in response to enabling of the respective device; and enabling each device in response to said input condition or each respective output condition according to the stored indication(s) for the device.

2. A method as claimed in claim 1 wherein the devices comprise power supplies.

3. A method as claimed in claim 2 wherein for each power supply the output condition comprises an output voltage of the power supply being above a threshold value.

4. A method as claimed in claim 3 wherein the input condition comprises an input voltage for the power supplies being above a threshold value.

5. A method as claimed in claim 4 wherein for each power supply each indication comprises a bit of a register in which different power supplies are represented by respective bits.

6. A method as claimed in claim 1 wherein for each device each indication comprises a bit of a register in which bit positions correspond to respective ones of the devices.

7. A method of enabling a plurality of power supplies to provide output voltages in a predetermined sequence, comprising the steps of:

for at least one of the power supplies, storing an indication that the power supply is to be enabled in dependence upon an input voltage;

for each other power supply, storing an indication of at least one power supply that is to be enabled prior to this power supply and in dependence upon an output voltage of which this power supply is to be enabled, whereby the stored indications represent the predetermined sequence;

monitoring an output voltage of at least each such prior enabled power supply; and enabling each power supply in dependence upon said input voltage or a respective output voltage according to the stored indication(s) for the power supply.

8. A method as claimed in claim 7 wherein for each power supply each stored indication comprises a bit of a register in which different ones of the power supplies are represented by respective bit positions.

9. A method as claimed in claim 8 wherein the step of storing the indications comprises storing the indications in a non-volatile memory and storing the indications from the memory in the registers in dependence upon said input voltage.

10. A method as claimed in claim 7 wherein said indication that the power supply is to be enabled in dependence upon an input voltage is stored for each of at least two of the power supplies.

11. A method as claimed in claim 7 wherein an indication of the same prior enabled power supply is stored for each of at least two power supplies for each of which an indication of a prior enabled power supply is stored.

12. A method as claimed in claim 7 wherein an indication of each of a plurality of prior enabled power supplies is stored for at least one power supply for which an indication of a prior enabled power supply is stored, and wherein this at least one power supply is enabled for an AND combination of the indications of said plurality of prior enabled power supplies.

13. A method as claimed in claim 7 and further comprising the step of disabling the power supplies in a predetermined disabling sequence, the step of disabling comprising the steps of, for each of a plurality of the power supplies, storing an indication of at least one power supply that is to be disabled prior to this power supply and in dependence upon an output voltage of which this power supply is to be disabled, the stored indications representing the predetermined disabling sequence, and disabling each of this plurality of the power supplies in dependence upon the respective output voltage according to the stored indication(s) for disabling the power supply.

14. A method as claimed in claim 13 wherein for each power supply each stored indication for enabling the power supply comprises a bit of a first register, and each stored indication for disabling comprises a bit of a second register, different ones of the power supplies being represented by respective bit positions in said first and second registers.

15. A method as claimed in claim 13 wherein an indication of the same prior disabled power supply is stored for each of at least two power supplies for each of which an indication of a prior disabled power supply is stored.

16. A method as claimed in claim 13 wherein an indication of each of a plurality of prior disabled power supplies is stored for at least one power supply for which an indication of a prior disabled power supply is stored, and wherein this at least one power supply is disabled for an AND combination of the indications of said plurality of prior disabled power supplies.

17. A method as claimed in claim 7 and further comprising the step of disabling power supplies in response to detected faults, the step of disabling comprising the steps of, for each of a plurality of the power supplies, storing an indication of at least one power supply in response to a detected fault for which this power supply is to be disabled, and disabling each respective power supply in response to a detected fault for any power supply for which an indication is stored for disabling the power supply in response to such a detected fault.

18. A method as claimed in claim 13 and further comprising the step of disabling power supplies in response to detected faults, the step of disabling in response to detected faults comprising the steps of, for each of a plurality of the power supplies, storing an indication of at least one power supply in response to a detected fault for which this power supply is to be disabled, and disabling each respective power supply in response to a detected fault for any power supply for which an indication is stored for disabling the power supply in response to such a detected fault, the power supplies disabled in response to a detected fault being disabled in said predetermined disabling sequence.

19. A power supply controller for carrying out the method of claim 7, the power supply controller comprising at least one control unit for monitoring said output voltages and for enabling each of said power supplies, said at least one control unit comprising a respective register for storing said indications for each of the power supplies to be enabled by the power supply controller.

20. A power supply controller as claimed in claim 19, wherein said at least one control unit further comprises a configuration register for information of connected power supplies to be enabled by the power supply controller.

21. A power supply controller as claimed in claim 19 and arranged to be powered from said input voltage, the power supply controller further comprising a non-volatile memory for storing said indications, and being arranged to store said indications from the memory in the respective registers in dependence upon said input voltage.

* * * * *